United States Patent Office 3,753,958
Patented Aug. 21, 1973

3,753,958
PULVERISABLE ACRYLATE RESINS
Frank Wingler, Leverkusen, Josef Pedain, Cologne-Bucheim, Hansgunter Appel, Bergisch-Gladbach-Paffrath, and Herbert Bartl, Odenthal-Hahnenberg, Germany, assignors to Bayer Aktiengesellschaft
Continuation-in-part of abandoned application Ser. No. 69,129, Sept. 2, 1970. This application Dec. 13, 1971, Ser. No. 207,615
Claims priority, application Germany, Dec. 31, 1969, P 19 65 740.0
Int. Cl. C08f 1/04, 15/40
U.S. Cl. 260—78.5 R                6 Claims

ABSTRACT OF THE DISCLOSURE

Copolymer of from 10 to 70 by weight of at least one ester of acrylic and/or methacrylic acid, 25 to 75% by weight of an optionally substituted styrene, vinyl ester or (meth) acrylonitrile, 5 to 50% by weight of at least one monomer from the group of $\alpha,\beta$-mono-olefinically unsaturated carboxylic acid with 3 to 5 carbon atoms, hydroxyalkyl esters of the foregoing acids and amides and amides derivatives of acrylic and methacrylic acid which is pulverisable, has a softening range of from 75 to 110° C. and an average molecular weight of from about 500 to 10,000 and process of producing the same by mixing said components, bulk polymerizing in a first stage to a conversion of 70 to 90% with an initiator decomposing into radicals below 70° C. and finishing bulk polymerization in a second stage to a conversion of at least 95% with an initiator decomposing at from 120 to 170° C.

CROSS-REFERENCE TO RELATED APPLICATION

This application is a continuation-in-part of application Ser. No. 69,129, filed Sept. 2, 1970 and now abandoned.

This invention relates to a process for the bulk polymerisation of special monomers by which it is possible to obtain pulverisable relatively low molecular weight lacquer resins.

It is known that organic monomers such as acrylates, styrene, vinyl acetate or vinyl chloride, can be polymerised in bulk, although this does involve numerous difficulties especially where the polymerisation is carried out on a commercial scale. The heat of reaction from the usually highly exothermic reactions has to be dissipated. In the case of relatively large batches, the heat of reaction can never be completely dissipated. Furthermore, the polymer has to be kept in a form in which it can be stirred during the polymerisation reaction in order to ensure the transfer of heat. In the event of inadequate dissipation of the heat of reaction, there is the danger of a temperature increase and hence the danger of explosions occurring during the polymerisation reactions. The bulk polymerisation reaction is usually carried out in tubular reactors and the polymer discharged either in the form of a melt or in the form of a granulate.

It is also known that monomers can be prepolymerised at an elevated temperature in a fast reaction to form a syrup which is then gradually polymerised to completion in the form of blocks at a low temperature. In the bulk polymerisation of vinyl chloride, a granulate which, although swollen with the monomer, is nevertheless free-flowing is initially obtained under high shear forces, and then polymerised to completion in a second stage. In this case, the heat of reaction is dissipated by refluxing a certain proportion of a monomer.

It is also known that organic monomers can be bulk polymerised in reaction screws. The advantage of screws is that they have a small reaction volume and hence promote the effective transfer of heat so that even highly viscous polymer melts can still be adequately intermixed. Accordingly, this type of bulk polymerisation is particularly suitable for the production of high molecular weight polymers, the only requirement being that polymerisation should take place quickly.

Relatively low molecular weight organic polymer resins with molecular weights of from 500 to 10,000 are required for the preparation of binders for lacquers. These low molecular weights are necessary in order to convert the resins into forms in which they can be applied and to ensure adequate levelling properties.

In order to adjust the relatively low molecular weights, the polymerisation reactions are carried out in the presence of chain transfer agents. For example, such solvents as benzene, toluene, xylene, compounds containing hydroxyl groups, ethers, esters, hydrocarbons, mercaptans, allyl compounds or halogenated alkanes may be used as chain transfer agents or as chain terminators.

Unfortunately, regulated polymerisation batches require relatively long polymerisation times so that bulk polymerisation cannot be carried out in screws. By contrast, where bulk polymerisation is carried out in relatively large vessels, there is the danger that, due to the increasing viscosity, the heat of reaction is dissipated gradually more ineffectively, as a result of which the temperature rises and the polymerisation reaction follows an explosive course where the initiator is present in a high concentration.

In addition to the regulator, relatively large quantities of from 0.5 to 2.5% by weight, based on the monomer, of initiators are required to obtain a complete reaction.

Solvent-free pulverisable resins which do not lump at temperatures of up to 50° C. and which can be converted into a free-flowing powder are required for the preparation of binders for powder coating techniques. Another requirement which the powdered resins have to satisfy is that, following application at temperatures of over 80° C. they should level out to form a film with a smooth surface. Properties such as these are shown, for example, by polyepoxide resins, although in most cases polyepoxide resins have only a limited resistance to weathering and, when exposed to weather, show a tendency towards chalking, whereas polyacrylate binders are considerably more resistant to weathering. Accordingly, acrylate-based powder lacquers would be highly advantageous.

The present invention relates to a process for the production of a pulverisable resin with a softening range of from 75 to 110° C. and an average molecular weight of from 500 to 10,000 by which comprises the steps of mixing (A) from 10 to 70% by weight of at least one ester of acrylic acid or methacrylic acid with an alkanol containing 1 to 20 carbon atoms or with cyclohexanol;
(B) from 25 to 70% by weight of at least one monomer from the group comprising styrene, $\alpha$-methyl styrene, p-tert.-butylstyrene, o-chlorostyrene, p-chlorostyrene, acrylonitrile, vinyl acetate, vinyl propionate, vinyl alkyl ethers having 1 to 8 carbon atoms in the alkyl moiety; methacrylonitrile, allyl acetate, vinyl chloride or vinylidene chloride;
(C) at least one monomer selected from the group consisting of
   (1) from 5 to 50% by weight of at least one hydroxyalkyl ester of acrylic acid, methacrylic acid, maleic acid, fumaric acid and itaconic acid having 2 to 8 carbon atoms in the said alkyl moiety;
   (2) from 5 to 40% by weight of at least one $\alpha,\beta$-mono-olefinically unsaturated carboxylic acid containing 3 to 5 carbon atoms;

(3) from 5 to 40% by weight of at least one monomer selected from the group consisting of acrylic amide, methacrylic amide, N-methylol ether of acrylic amide and methacrylic amide, diacetone acrylamide and diacetone methacrylamide;

the percentage content of the sum of monomers (A), (B) and (C) being 100% by weight and 0.1 to 3% by weight of a molecular weight regulator and 10 to 1000 p.p.m. of a polymerization inhibitor, polymerizing said mixture in a first stage at temperatures of from 100 to 145° C. with an initiator decomposing into radicals below 70° C. up to conversion of at least 70% and at most 90% and finishing the polymerization in a second stage at temperatures of from 150 to 170° C. with the aid of an initiator decomposing at temperatures from 120 to 170° C. up to a conversion of at least 95%.

The process according to the invention gives a pulverisable resin which contains less than 5% by weight of volatile constituents, generally less than 2 to 0.1% by weight, and which does not lump even at room temperature, i.e. converted into a powder, it remains free-flowing even at room temperature.

In one preferred modification of the process, the bulk polymerisation reaction can also be carried out without danger in relatively large reaction vessels providing the monomer mixture is heated before polymerisation to an elevated temperature, i.e. to a temperature above 100° C. and preferably between 130 and 145° C., an organic initiator which decomposes into radicals below 70° C. is added and polymerisation continued up to a conversion of at least 70% and at most 90%. Polymerisation up to a conversion of more than 95% is subsequently carried out in a second process stage at a temperature above 150° C. and preferably at a temperature of from 160 to 170° C. with the aid of an initiator decomposing at a temperature of from 120 to 170° C.

The polymerisation reaction can be carried out either continuously or in batches. In cases where it is carried out continuously, the initiator which decomposes at an elevated temperature is added in a second reaction zone with a higher prevailing temperature in which the conversion is already at least 70%.

The initiator decomposing at a temperature below 70° C. should have a half-life decay time of less than 40 minutes at 70° C., whilst the initiator decomposing at a temperature of from 120 to 170° C. should have a decay time at 120° C. of longer than 10 minutes.

By virtue of the process according to the invention, it is possible to keep the polymerisation reaction constantly under control and at the same time to obtain an almost complete conversion, thus preventing the powdered resins from lumping. If polymerisation is carried out solely with a quickly decomposing initiator, it is impossible to obtain complete conversions because polymerisation of the aforementioned monomer mixtures only proceeds very slowly after a conversion of approximately 70% has been obtained. The initiator subsequently added then loses its effectiveness too quickly in relation to the polymerisation velocity. In order to obtain a complete conversion with the quickly decomposing initiator, the initiator must be used in a quantity in excess of 0.7%. However, more than 0.7% of an initiator decomposing at a temperatutre below 70° C. is undesirable because relatively large quantities of decomposition products can soften the resin, as a result of which it will lump.

If by contrast polymerisation is carried out with an initiator which decomposes at a temperature of from 120 to 170° C., the reaction may proceed uncontrollably. Due to the long decomposition time of the initiator, relatively large quantities of the unused initiator can accumulate in the reaction mixture and these may decompose suddenly in the event of a sudden increase in temperature through the inadequate dissipation of heat and thus promote an explosive reaction. If the monomers have already been polymerised to a conversion of substantially 70%, the fused polymer acts both as a diluent and as a heat transfer agent. The temperature is governed by the viscosity of the lacquer melt and in the first stage is from 100 to 145° C. and in the second stage from 150 to 170° C.

On completion of the polymerisation reaction, any volatile constituents can be distilled off in vacuo either continuously or in batches. The volatile constituents can also be removed by falling-film evaporation.

The following quickly decomposing peroxides belong to the first group of initiators which are used in the first stage and which decompose at temperatures below 70° C.: tert-butyl perpivalate, tert-butyl perisobutyrate, tert-butyl peroctoate or monochloro- or dichloro-benzoyl peroxide, lauroyl peroxide, cyclohexanone hydroperoxide, percarbonates such as diisopropyl peroxy dicarbonate, cyclohexyl peroxy dicarbonate, diisooctyl peroxy dicarbonate, sulphonyl peroxides such as acetyl cyclohexyl sulphonyl peroxide, acetyl isopropyl sulphonyl peroxide and nitrogen compounds such as azodiisobutyrodinitrile.

Di-tert-butyl peroxide, benzoyl peroxide, tert-butyl hydroperoxide, cumyl hydroperoxide, methyl ethyl ketone peroxide and tert-butyl perbenzoate, for example, belong to the group of slowly decomposing initiators, that means above 120° C.

The initiators of both groups are each added preferably in quantities of from 0.5 to 0.7% by weight, based on the monomer mixture, during the polymerisation reaction. Accordingly, a total of from 1 to 1.4% by weight of the initiators is used. The initiator decomposing at a relatively low temperature has to be added throughout the entire duration of the first stage of the polymerisation reaction, whilst the initiator decomposing at an elevated temperature may be added in portions.

On completion of the polymerisation reaction, the residual monomers and low boiling initiator decomposition products or regulators can be distilled off in a stream of nitrogen or by applying a vacuum. The lacquer melt can be cooled on cooling surfaces to form a glass-like resin or alternatively it may be directly further processed in the melt form.

Suitable monomers include the unsaturated compounds normally used in the production of acrylic resins providing they do not decompose or promote crosslinking at the polymerisation temperatures. The monomers can be mixed in the required ratios before polymerisation and then added, or alternatively one or other of the monomers can be added during the polymerisation reaction in different quantities.

This technique is preferably used in cases where the monomers polymerise at different velocities. The more quickly polymerising monomer will then be added at a slower rate.

In cases where the polymerisation reaction is carried out continuously, the more quickly polymerising monomer is preferably added to the second or third reaction zone. In cases where tubular reactors are used, the monomers to be subsequently added may also be introduced at the lower end of the reaction tube.

Suitable copolymerisable monomers of group (A) include esters of acrylic acid or methacrylic acid with an alkanol containing 1 to 20, preferably with 1 to 8 carbon atoms and with cyclohexanol. The following are mentioned as examples: methylacrylate, ethylacrylate, n- or iso-propyl acrylate, butyl acrylate, isooctyl acrylate, dodecyl acrylate, octadecyl acrylate, cyclohexyl acrylate and the corresponding methacrylic acid esters.

The monomers of group (A) are added in quantities of from 10 to 70% by weight, based on the total amount of monomers.

Group (B) monomers include styrene, α-methyl styrene, o-chlorostyrene, p-chlorostyrene, p-tert.-butylstyrene, acrylonitrile, vinyl acetate, vinyl propionate, vinyl alkyl ethers having 1 to 8 carbon atoms in the alkyl moiety, methacrylonitrile, allyl acetate, vinyl chloride or vinylidene chloride, which are used in quantities of from 25 to 70% by weight, based on the total quantity of monomers.

It is preferred to use styrene and/or α-methyl styrene.

Group (C) monomers include (1) copolymerisable monomers containing hydroxyl groups such as hydroxyalkyl esters of acrylic acid, methacrylic acid, maleic acid, fumaric acid or itaconic acid having 2 to 8 carbon atoms in the alkyl moiety, preferably 2 to 4 carbon atoms. The following are mentioned as examples: hydroxyethyl acrylate, hydroxypropyl acrylates, hydroxybutyl acrylates and the corresponding methacrylic acid esters.

The group (1) monomers are added in quantities of from 5 to 50% by weight, based on the total amount of monomers. The hydroxyalkyl esters of acrylic acid and methacrylic acid having 2 to 4 carbon atoms in the alkyl moiety are preferably used.

Group (2) monomers include α,β-mono-olefinically unsaturated carboxylic acids containing 3 to 5 carbon atoms. They are used in quantities of from 5 to 40% by weight, based on the total amount of monomers. The following are mentioned by way of example: acrylic acid, methacrylic acid, crotonic acid, maleic acid, fumaric acid or itaconic acid, preferably acrylic acid and methacrylic acid.

Group (3) monomers include acrylic and methacrylic amides or N-substituted derivatives such as N-alkyl acryl or methacryl amides having 1 to 8 carbon atoms in the alkyl moiety, N-methylol or N-methylol ether of acrylic and methacrylic acid amide, Mannich bases of acrylic and methacrylic amide or diacetone acrylamide or diacetone methacrylamide. Derivatives of acrylic or methacrylic acid amide are used providing they do not promote crosslinking during the copolymerisation reaction. The group (3) monomers are used in quantities of from 5 to 40% by weight, based on the total quantity of monomers.

It is preferred to use acrylic and methacrylic acid amides. Special monomer combinations are mixtures of (A) from 30 to 65% by weight of at least one ester of acrylic acid or methacrylic acid with an alkanol containing 1 to 8 carbon atoms;
(B) from 25 to 60% by weight of styrene, α-methylstyrene or mixtures thereof;
(C) from 5 to 20% by weight of acrylic acid, methacrylic acid, itaconic acid, maleic or fumaric acid, crotonic acid or mixtures thereof or of (A) from 30 to 65% by weight of at least one ester of acrylic acid or methacrylic acid with an alkanol containing 1 to 8 carbon atoms;
(B) from 25 to 60% by weight of styrene, α-methylstyrene or mixtures thereof;
(C) from 5 to 30% by weight of at least one hydroxy alkyl ester of acrylic or methacrylic acid having 2 to 4 carbon atoms in the alkyl moiety.

A further monomer mixture consists of (A) from 30 to 65% by weight of at least one ester of acrylic acid or methacrylic acid with an alkanol containing 1 to 8 carbon atoms;
(B) from 25 to 60% by weight of styrene, α-methylstyrene or mixtures thereof;
(C) from 5 to 20% by weight of acrylic or methacrylic acid amide.

At least the monomer mixture of (A) from 30 to 65% by weight of at least one ester of acrylic acid or methacrylic acid with an alkanol containing 1 to 8 carbon atoms;
(B) from 25 to 60% by weight of styrene, α-methylstyrene or mixtures thereof;
(C) from 5 to 30% by weight of at least one hydroxy alkyl ester of acrylic or methacrylic acid having 2 to 4 carbon atoms in the alkyl moiety and from 5 to 20% by weight of acrylic or methacrylic acid amide.

Suitable acrylate resins for powder coating processes should have an average molecular weight of from about 500 to 10,000 to guarantee a sufficient flow to form a film with a smooth surface after applying on substrates such as metals and heating. Therefore the copolymerization is is carried out in the presence of a molecular weight regulator and a polymerization inhibitor.

Additives which reduce molecular weight are introduced in quantities of from 0.1 to 3% by weight, preferably 0.5 to 2% by weight, based on the monomer mixture. Examples of regulators such as these include mercaptans such as n- or tert.-dodecyl mercaptan, disulfides such as diisopropyl xanthic disulfide, olefins such as cyclohexene, unsaturated alcohols such as methylvinyl carbinol or carbon tetrachloride.

Polymerization inhibitors are used in amounts of 50 to 1000 p.p.m., based on the monomer mixture. Suitable inhibitors are quinone, hydroquinone and monoethers thereof such as monomethylether of hydroquinone, phenolic compounds such as di-tert.-butyl-p-cresol, triphenylmethane dyes such as methylene blue, amines such as dinitrodiphenylamine, derivatives of phenothiazine.

Without inhibitors the bulk polymerization leads to products having undesirable high molecular weight or sometimes to uncontrollable explosive course at the beginning of the reaction.

One major advantage of bulk polymerization over solution polymerisation lies in the better utilisation of the space available in the polymerisation vessels. The volume/time yields are some 3 to 10 times higher than the volume/time yields obtained in solution polymerisation. Another advantage of bulk polymerisation is that the resins can be directly dissolved in any solvents providing they represent a solvent for the resin. By contrast, some solvents are unsuitable for solution polymerisation on account of their tendency to influence molecular weight or on account of their inability to dissolve certain monomers. For example, acetone is a poor solvent for solution polymerisation because acetone is a powerful regulator and, on account of its high vapour pressure, does not allow polymerisation temperatures higher than 60° C. at normal pressure. By contrast, the bulk acrylic resins can be produced at an elevated temperature in the required molecular weight and then dissolved in acetone. Acrylamide is insoluble, for example, in toluene or xylene and for this reason cannot be polymerised in pure toluene or xylene solutions. By contrast, the copolymers containing acrylamide are soluble in these solvents. Accordingly, it is possible to prepare clear toluene or xylene lacquer solutions of resins containing acrylamide. The solvent-free acrylic resins are directly employed for a number of applications, for example in the production of powder coatings. The pulverisable resins obtained by the process according to the invention can be reacted or mixed with a reactive component. The reaction can be carried out simply by mixing at room temperature in the powder form. by gassing in a fluidised bed or even in the melt in a kneader, on mixing rolls or in mixing screws. The melts are then cooled, granulated or ground. The reactive components are used for subsequent crosslinking in the powder coating process. Reactive components include those compounds which react with the OH groups, amide groups or carboxylic acid groups of the resins such as, for example, isocyanates, N-methylol compounds, polycarboxylic acids or carboxylic acid anhydrides, polyepoxides, blocked isocyanates.

The copolymers according to the invention can readily be converted without lumping into grain sizes of from about 4 to 300μ and can then be used for coating a variety of materials by the various techniques of dip and spray coating processes and also by whirl-sintering or flame spraying processes or by the electrostatic coating technique.

The coatings are primarily used for protection against corrosion and for protection against mechanical wear for articles made of metal, for example of steel, cast steel, copper, brass, bronze, red bronze, aluminium and its alloys, but also of porcelain, ceramics, plastics and a few types of wood. They can also be used as electrically insulating coatings in electrical engineering, for example for lights, switches and motor components, etc. Domestic appliances, refrigerator grids, clothing shelves, towel holders, shop fittings, sales counters, decorative articles, shopping baskets and crates and pipes can be coated by the fluidisation sintering technique. The flame spray process and electrostatic powder coating process are best used for coating relatively large areas of the aforementioned materials. They are used, for example, in the external and internal coating of pipes and containers.

The percentages are percent by weight unless otherwise stated.

EXAMPLE 1

8 kg. of a monomer mixture consisting of 50 parts by weight of styrene, 30 parts by weight of butyl acrylate, 20 parts by weight of hydroxypropyl methacrylate, 1 part by weight of tert-dodecyl mercaptan and 0.005 part by weight of hydroquinone, are heated under nitrogen until the mixture refluxes gently in a 40 litre capacity vessel equipped with a stirring mechanism. A temperature of from 130 to 140° C. is automatically adjusted. A cooled mixture of 15 g. of tert-butyl perpivalate in a petrol fraction (B.P.$_{760}$ 70 to 130° C.) and 640 g. of the monomer mixture is introduced into the above mentioned monomer mixture over a period of 30 minutes and at the same time polymerised. The solids content is now 80% (as determined by concentrating a sample by evaporation at 250° C. for 30 minutes). If the reaction is too vigorous, it is sufficient to stop the addition of the initiator. Polymerisation stops in a few seconds. A mixture of 16 kg. of the monomer mixture and 160 g. of tert-butyl perpivalate (the components are mixed together shortly before introduction into a vessel cooled with brine) is introduced into the melt over a period of 3 hours at 140 to 145° C., heated to 160° C. after the reaction and then 180 g. of di-tert-butyl peroxide and 180 g. of monomer mixture are added dropwise over a period of a further hour. The volatile constituents (catalyst decomposition products and monomer impurities) are then distilled off and the temperature kept at 170° C. for 2 hours. This is followed by brief degassing in vacuo. The melt is run off. The lacquer has a melting point of 80° C., and can be pulverised without lumping. The average molecular weight is approximately 5600, as determined by osmometry.

EXAMPLE 2

The test apparatus consists of 3 jacketed tubular glass reactors each 1.65 litres in capacity. A spiral stirrer is used for stirring. The first reactor is heated with an oil thermostat which has a contact thermometer with an impulse generator which dips into the lacquer melt. The thermostat has a cooling coil through which air is constantly blown. The other two reactors are also heated with oil, except that the oil temperatuure of the thermostat is controlled from outside. 1.65 kg. per hour of the monomer mixture of Example 1 including regulator and inhibitor with 0.7 part by weight of tert-butyl perpivalate are continuously introduced into the first vessel. The contact thermometer stands at 140° C. An internal temperature of 140 to 145° C. is automatically regulated for an oil temperature of 90 to 100° C. The lacquer melt flows into the second vessel and is kept at an internal temperature of 150° C. 0.7% of di-tert-butyl peroxide are continuously introduced into the second reactor and the melt polymerised to completion in the third vessel at a temperature of 160° C. The volatile constituents are blown off with a stream of nitrogen. The lacquer is allowed to flow on to metal sheets. Using this apparatus, it was possible to produce up to 2.6 kg. of lacquer per hour.

EXAMPLE 3

The procedure of Example 1 is repeated, except that the monomers used consist of 40 parts by weight of styrene, 10 parts by weight of methyl acrylate, 20 parts by weight of 2-hydroxypropyl methacrylate, 30 parts by weight of butyl acrylate, 1.3 parts by weight of tert-dodecyl mercaptan and 0.005 part by weight of hydroquinone.

The polymerisation reaction is carried out as described in Example 1. The lacquer melt has a solids content of 100% (as determined by concentrating a 10 g. sample by evaporation for 30 minutes at 250° C.). The lacquer has a softening point of 80° C. and an average molecular weight of approximately 6000 as measured by osmometry.

EXAMPLE 4

A monomer mixture consisting of 50 parts by weight of styrene, 10 parts by weight of acrylic acid, 40 parts by weight of butyl acrylate, 2 parts by weight of tert-dodecyl mercaptan and 0.01 part by ewight of di-tert-butyl cresol is polymerised under the conditions described in Example 1. The brittle lacquer melt has a softening point of 85° C. and a solids content of 99% by weight. The average molecular weight is approximately 3000 as measured by osmometry.

EXAMPLE 5

A mixture consisting of 25 parts by weight of styrene, 5 parts by weight of acrylamide, 6 parts by weight of acrylic acid, 10 parts by weight of 2-hydroxypropyl methacrylate, 54 parts by weight of ethyl hexyl acrylate, 2 parts by weight of tert-dodecyl mercaptan and 0.01 part by weight of monomethylether of hydroquinone is polymerised under the conditions described in Example 1. The lacquer melt solidifies to form a pulverisable non-lumping resin with a solids content of 99.5% by weight, a softening point of 97° C. and an average molecular weight of approximately 9000, as measured by osmometry.

The resins of Examples 1 to 5 are all soluble in such conventional solvents as xylene, toluene, benzene, methyl ethyl ketone, butyl acetate and ethyl glycol acetate.

EXAMPLE 6

600 g. of methyl methacrylate, 100 g. of butyl methcrylate, 300 g. of butane diol (1,4) monoacrylate, 15 g. of tert-dodecyl mercaptan and 0.1 g. of hyroquinone are introduced under nitrogen into a flask equipped with a helical stirrer. The mixture is heated to 140° C. followed by the dropwise addition of 7 g. of tert-butyl perpivalate over a period of 3 hours. The temperature rises to 170° C. 7 g. of di-tert-butyl peroxide are then stirred in over a period of 1 hour and at the same time the mixture heated to 200° C. The melt is run off into pans, has a softening point of 105° C. and an OH number of 110.

EXAMPLE 7

As in Example 6, a mixture of 300 g. of trimethylol propane monoallyl ether, 600 g. of styrene, 100 of isooctyl acrylate, the regulator and inhibitor is polymerised with 7 g. of tert-butyl peroctoate at 150° C. 7 g. of tert-butyl peroxide are then stirred in, after which the mixture is kept at 170° C. for 2 hours. By applying a vacuum of 1 torr, volatile constituents are distilled off at a bath temperature of 200° C., and the melt run off onto sheets. The solidified pulverisable melt has an OH number of 150.

EXAMPLE 8

A mixture consisting of 25 parts by weight of styrene, 10 parts by weight of methmethacrylate, 15 parts by weight of butylmethacrylate, 10 parts by weight of acrylamide, 40 parts by weight of butylacrylate, 2 parts by weight of tert.-dodecylmercaptan and 0.03 parts by weight of hydroquinone is polymerized under the conditions described in Example 1. The lacquer melt solidifies to form a pulverisable non-lumping resin with a softening point of 105° C. and an average molecular weight of 7900.

EXAMPLE 9

A mixture consisting of 50 parts by weight of styrene, 15 parts by weight of methacrylic acid 2-hydroxyethylester, 5 parts by weight of methacrylamide, 30 parts by weight of butylacrylate, 1.5 parts by weight of tert.-dodecylmercaptan and 0.005 parts by weight of hydroquinone is polymerized under the conditions described in Example 1. The sirup solidifies after cooling to room temperature and a hard, pulverisable resin of the average molecular weight of 6200 is obtained.

What is claimed is:

1. A process for the production of pulverisable resins with softening ranges of from about 75 to 110° C. and average molecular weights of from about 500 to 10,000 which comprises the steps of mixing
    (A) from 10 to 70% by weight of at least one ester of acrylic acid or methacrylic acid with an alkanol containing 1 to 20 carbon atoms or with cyclohexanol;
    (B) from 25 to 70% by weight of at least one monomer selected from the group consisting of styrene, α-methyl styrene, p-tert.-butylstyrene, o-chlorostyrene, p-chlorostyrene, acrylonitrile, vinyl acetate, vinyl propionate, vinyl alkyl ethers having 1 to 8 carbon atoms in the alkyl moiety, methacrylonitrile, alkyl acetate, vinyl chloride and vinylidene chloride;
    (C) at least one monomer selected from the group consisting of
        (1) from 5 to 50% by weight of at least one hydroxyalkyl ester of acrylic acid, methacrylic acid, maleic acid, fumaric acid and itaconic acid having 2 to 8 carbon atoms in the said alkyl moiety;
        (2) from 5 to 40% by weight of at least one α,β-monoolefinically unsaturated carboxylic acid containing 3 to 5 carbon atoms;
        (3) from 5 to 40% by weight of at least one monomer selected from the group consisting of acrylic amide, methacrylic amide, N-methylol ether of acrylic amide and methacrylic amide, diacetone acrylamide and diacetone methacrylamide,
the percentage content of the sum of monomers (A), (B) and (C) being 100% by weight and 0.1 to 3% by weight of a molecular weight regulator based on the weight of the monomer mixture and 10 to 1000 p.p.m. of a polymerization inhibitor based on total monomers, bulk polymerizing said mixture in a first stage at temperatures of from 100 to 145° C. in the presence of an initiator decomposing into radicals below 70° C. up to a conversion of at least 70% and at most 90% and finishing the bulk polymerization in a second stage at temperatures of from 150 to 170° C. in the presence of an initiator decomposing into radicals at temperatures from 120 to 170° up to a conversion of at least 95%, the initiators of both stages being present in an amount of about 0.5 to 0.7% by weight, based on the weight of the monomer mixture.

2. A process as claimed in claim 1, wherein the polymerization steps are carried out continuously.

3. A process as claimed in claim 1, wherein a monomer mixture of
    (A) from 30 to 65% by weight of at least one ester of acrylic acid or methacrylic acid with an alkanol containing 1 to 8 carbon atoms;
    (B) from 25 to 60% by weight of styrene, α-methylstyrene or mixtures thereof;
    (C) from 5 to 20% by weight of acrylic acid, methacrylic acid, itaconic acid, maleic or fumaric acid, crotonic acid or mixtures thereof
is polymerized.

4. A process as claimed in claim 1, wherein a monomer mixture of
    (A) from 30 to 65% by weight of at least one ester of acrylic acid or methacrylic acid with an alkanol containing 1 to 8 carbon atoms;
    (B) from 25 to 60% by weight of styrene, α-methylstyrene or mixtures thereof;
    (C) from 5 to 30% by weight of at least one hydroxy alkyl ester of acrylic or methacrylic acid having 2 to 4 carbon atoms in the alkyl moiety
is polymerized.

5. A process as claimed in claim 1, wherein a monomer mixture of
    (A) from 30 to 65% by weight of at least one ester of acrylic acid or methacrylic acid with an alkanol containing 1 to 8 carbon atoms;
    (B) from 25 to 60% by weight of styrene, α-methylstyrene or mixtures thereof;
    (C) from 5 to 20% by weight of acrylic or methacrylic acid amide
is polymerized.

6. A process as claimed in claim 1, wherein a monomer mixture of
    (A) from 30 to 65% by weight of at least one ester of acrylic acid or methacrylic acid with an alkanol containing 1 to 8 carbon atoms;
    (B) from 25 to 60% by weight of styrene, α-methylstyrene or mixtures thereof;
    (C) from 5 to 30% by weight of at least one hydroxy alkyl ester of acrylic or methacrylic acid having 2 to 4 carbon atoms in the alkyl moiety and from 5 to 20% by weight of acrylic or methacrylic acid amide is polymerized.

References Cited
UNITED STATES PATENTS

| | | | |
|---|---|---|---|
| 2,220,033 | 10/1940 | Bauer et al. | 260—84 |
| 2,817,651 | 12/1957 | Chapin et al. | 260—86.1 |
| 2,892,788 | 6/1959 | Stewart et al. | 252—51.5 |
| 2,897,174 | 7/1959 | Chapin et al. | 260—43 |
| 2,912,416 | 11/1959 | Newey | 260—80.5 |
| 2,994,676 | 8/1961 | Kucsan et al. | 260—29.4 |
| 3,001,942 | 9/1961 | Mulvany et al. | 252—56 |
| 3,168,500 | 2/1965 | Suen et al. | 260—80.3 |
| 3,249,651 | 5/1966 | Gaylord | 260—834 |
| 3,444,124 | 5/1969 | Talet | 260—33.4 |
| 3,493,550 | 2/1970 | Schmitt | 260—86.1 |

FOREIGN PATENTS

| | | | |
|---|---|---|---|
| 456,892 | 5/1949 | Canada | 260—80.75 |

JAMES A. SEIDLECK, Primary Examiner

S. M. LEVIN, Assistant Examiner

U.S. Cl. X.R.

260—31.2 N, 31.2 R, 31.6, 32.8 N, 32.8 R, 33.6 UA, 63 R, 80.73, 70.75, 80.76, 80.8; 117—123 D, 132 C, 148, 161 UT

UNITED STATES PATENT OFFICE
CERTIFICATE OF CORRECTION

Patent No. 3,753,958  Dated August 21, 1973

Inventor(s) Frank Wingler et al

It is certified that error appears in the above-identified patent and that said Letters Patent are hereby corrected as shown below:

Col. 6, line 21, "50" should read -- 10 --.

Col. 9, line 29, "alkyl acetate", should read -- allyl acetate -- .

Signed and sealed this 13th day of August 1974.

(SEAL)
Attest:

McCOY M. GIBSON, JR.      C. MARSHALL DANN
Attesting Officer          Commissioner of Patents